United States Patent Office
3,663,595
Patented May 16, 1972

3,663,595
CARBALKOXYAMINOPROPANE
Laszlo Beregi, Boulogne, Pierre Hugon, Rueil-Malmaison, and Jean-Claude Le Douarec, Suresnes, France, assignors to Société en nom collectif Science Union et Cie, Societe Francaise de Recherche Medicale, Suresnes, France
No Drawing. Filed Sept. 6, 1968, Ser. No. 762,328
Claims priority, application France, Sept. 22, 1967, 121,906
Int. Cl. C07c 125/06
U.S. Cl. 260—471 C
1 Claim

ABSTRACT OF THE DISCLOSURE 1-trifluoromethylphenyl-2 - carbalkoxyamino propanes having anorexigenic properties.

---

The present invention provides carbalkoxyaminopropanes of the general formula

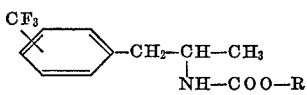
$$\text{NH-COO-R} \qquad \text{I}$$

wherein R represents a lower-alkyl radical containing up to 4 carbonatoms inclusive.

The use of the trifluoromethylated phenyl-aminopropanes in human therapy is known as appetite inhibitors in the treatment of obesity (U.S. Pat. No. 3,198,833).

The present invention relates to a notable improvement in this field owing to the discovery that the carbalkoxylic esters of these compounds possess, besides an excellent anorexigenic cativity, analgesic and anticonvulsant properties with an improved tolerance.

It was in fact observed that the new compounds of the invention have no stimulating activity on the central nervous system and no undesirable effect on the cardiovascular system.

Their gastric tolerance is quite good, without the side effects inherent in this kind of product.

It was also observed that they have an action of long duration which permits the patients to reduce the drug intake to 1 or 2 doses per day.

The toxicity of these compounds is very low. For example the DL$_{50}$ p.o. in mice is only 118.3 mg./kg. for 1-(m-trifluoromethylphenyl)-2 carbethoxyamino propane.

This same compound, administered p.o. in the rat at a dose of 10 mg./kg., reduces by 50% the food intake for 2 hours, and at a dose of 5 mg./kg. p.o. it suppresses completely the food intake in the dog, for the same time (J. C. Le Douarec's method: Thesis Paris 1963).

The analgesic activity, studied in mice according to Haffner's method [Deut. Med. Wsch. 55, 731 (1929), as modified by Bianchi and Franceschini, Br. J. Pharm. 9, 280 (1954)] shows an inhibition of 50% of the threshold of pain perception with 40 mg./kg. of this compound.

An anticonvulsive activity was also noted with 30 mg./kg., protecting 50% of the mice from electroshock effect [E. A. Swinyard et al., J. Pharm. Exp. Ther. 106, 319 (1952)].

The properties herein-above described and their low toxicity make these compounds useful in therapy, especially in the treatment of obesity, pain and epilepsy. The doses may vary from 10 to 100 mg. taken one or 2 times per day. The active principle may be associated with the usual pharmaceutical carriers for oral, rectal or parenteral administration. Suitable pharamaceutical carriers, include, for example, talc, starch, lactose, and magnesium stearate, and different carriers will be employed for different pharmaceutical forms, such as tablets, capsules, dragees, etcetera, as will be well understood by one skilled in the art.

The new compounds of the present invention can be prepared by known methods, as by reaction of a primary amine of Formula II:

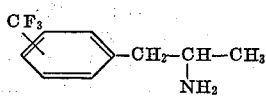
$$\text{NH}_2 \qquad \text{II}$$

on an alkyl chloroformate of general Formula III:

$$\text{Cl—COOR} \qquad \text{(III)}$$

wherein R has the value previously defined.

The following non-limitative examples illustrated the invention.

EXAMPLE 1

1-(m-trifluoromethylphenyl)-2-carbethoxyaminopropane

To a solution of 21 parts of 1-m-trifluoromethylphenyl-2-aminopropane in 100 parts of anhydrous ether were added, over a period of 15 minutes, 5.6 parts of ethyl chloroformate dissolved in 50 parts of ether. After 1 hour of heating under reflux to complete the reaction, the starting amine hydrochloride is suctioned off, the filtrate is dried under vacuum and the residue is distilled. 9.3 parts of final product were obtained B.P./2.5 mm.: 129–130° C.

EXAMPLE 2

1-(o- and p-trifluoromethylphenyl)-2-carbethoxyaminopropane

In the same manner as given in Example 1, the corresponding ortho- and para-trifluoromethylphenyl compounds are prepared from exactly the same starting materials, starting only with the ortho- and para-trifluoromethylphenyl-2-aminopropane instead of the meta-trifluoromethylphenyl-2-aminopropane as employed in Example 1.

EXAMPLE 3

Other 1-(o-, m-, and p-trifluoromethylphenyl)-2-carbalkoxyaminopropanes

In exactly the same manner as given in the foregoing Examples 1 and 2, other 2-carbolower-alkoxy amino propanes are prepared, including the 1-(o-, m-, and p-trifluoromethylphenyl)-2-carbomethoxyaminopropanes, the corresponding carbopropoxyaminopropanes, the corresponding carbisopropoxyaminopropanes, the corresponding carbobutoxyaminopropanes, the corresponding carbo (sec. butoxy) aminopropanes, and the corresponding carbo (tert. butoxy) aminopropanes, all to which esters are prepared from the same starting materials as employed in Examples 1 and 2 but substituting the corresponding lower-alkyl chloroformate for the ethyl chloroformate employed in Examples 1 and 2.

EXAMPLE 4

For administration via oral route, sugar-coated tablets of the following composition are prepared by the usual pharmaceutical technique:

| | Mg. |
|---|---|
| 1 - (m - trifluoromethylphenyl) - 2 - carbethoxyamino propane | 10 |
| Lactose | 24 |
| Starch | 20 |
| Sugar | 30 |
| Gum-arabic | 1 |
| Talc | 2 |

Gum tragacanth, magnesium stearate, talc, dye q.s. for 1 tablet of 100 mg.

Compositions prepared by admixture of the foregoing ingredients according to conventional procedure are entirely satisfactory and efficacious when administered according to the method of the invention for the purposes of the invention. Similarly, representative compositions prepared in the same manner but substituting the compounds of Examples 2 and 3 for the active ingredient employed in Example 4 are also entirely satisfactory and completely efficacious when administered according to the method of the invention or the purposes of the invention. Other representative compositions may also be employed, as previously disclosed, and such will be immediately apparent to one skilled in the art to which this invention pertains.

It is to be understood that the invention is not to be limited to the exact details of operation or exact compounds, compositions, or procedures shown and described, as obvious modifications and equivalents will be apparent to one skilled in the art, and the invention is therefore to be limited only by the scope of the appended claim.

What we claim is:

1. 1 - meta - trifluoromethylphenyl-2-carbethoxyaminopropane.

References Cited
UNITED STATES PATENTS 3,308,019   3/1967   Kopf et al. _____ 260—471

LORRAINE A. WEINBERGER, Primary Examiner

L. A. THAXTON, Assistant Examiner

U.S. Cl. X.R.

424—300